United States Patent
Park

(10) Patent No.: US 10,724,786 B2
(45) Date of Patent: Jul. 28, 2020

(54) EXTERNAL WATER-PURIFYING FILTER CASE, INSTALLATION STRUCTURE THEREOF AND STERILIZING METHOD USING THE SAME

(71) Applicant: LG ELECTRONICS INC., Seoul (KR)

(72) Inventor: Hyunji Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 121 days.

(21) Appl. No.: 15/607,846

(22) Filed: May 30, 2017

(65) Prior Publication Data
US 2017/0350641 A1  Dec. 7, 2017

(30) Foreign Application Priority Data

Jun. 7, 2016  (KR) .................. 10-2016-0070253

(51) Int. Cl.
*F25D 23/12* (2006.01)
*E03B 7/07* (2006.01)
(Continued)

(52) U.S. Cl.
CPC .......... *F25D 23/126* (2013.01); *B01D 27/08* (2013.01); *B01D 35/30* (2013.01); *C02F 1/003* (2013.01);
(Continued)

(58) Field of Classification Search
CPC . F25D 23/126; F25D 2323/121; B01D 27/08; B01D 35/30; E03B 7/074;
(Continued)

(56) References Cited

U.S. PATENT DOCUMENTS 5,320,752 A * 6/1994 Clack .................. B01D 24/105
210/282
5,813,245 A 9/1998 Coates et al.
(Continued)

FOREIGN PATENT DOCUMENTS

CN  203190810  9/2013
CN  203332630  12/2013
(Continued)

OTHER PUBLICATIONS

KR-99017473 (machine translation and original attached) (Year: 1999).*
(Continued)

*Primary Examiner* — Liam Royce
(74) *Attorney, Agent, or Firm* — Ked & Associates, LLP

(57) ABSTRACT

An installation structure of an external filter case for a refrigerator is provided. The filter case may include a main body that provides an inner space in which an internal line may be installed and water filters may be installed, and a cover that covers the inner space of the main body and is detachably coupled with the main body. The main body may have an open front side and may include bosses that protrude from its bottom face. The cover may include insertion holes into which the bosses may be inserted. A lower portion of the main body may be coupled with a lower portion of the cover. Magnets may be installed in upper portions of the main body and the cover, respectively, such that the main body and the cover may be coupled with each other by a magnetic force.

20 Claims, 11 Drawing Sheets

(51) Int. Cl.
*B01D 27/08* (2006.01)
*B01D 35/30* (2006.01)
*C02F 1/00* (2006.01)
*C02F 1/44* (2006.01)
*C02F 1/28* (2006.01)
*F25D 23/10* (2006.01)
*B01D 35/16* (2006.01)
*B01D 29/00* (2006.01)

(52) U.S. Cl.
CPC .............. *E03B 7/074* (2013.01); *C02F 1/283* (2013.01); *C02F 1/444* (2013.01); *C02F 2201/006* (2013.01); *C02F 2301/043* (2013.01); *C02F 2307/10* (2013.01); *C02F 2307/12* (2013.01); *F25D 2323/121* (2013.01)

(58) Field of Classification Search
CPC .... C02F 1/003; C02F 1/283; C02F 2301/043; C02F 2201/006; C02F 2307/12; C02F 2307/10; C02F 1/444
See application file for complete search history.

(56) References Cited

U.S. PATENT DOCUMENTS

| | | | | |
|---|---|---|---|---|
| 2003/0011482 | A1* | 1/2003 | Harms | ................... G08B 21/20 340/605 |
| 2006/0254971 | A1* | 11/2006 | Tubby | ................... B01D 27/08 210/235 |
| 2016/0025406 | A1* | 1/2016 | An | ........................ F25D 23/126 222/143 |

FOREIGN PATENT DOCUMENTS

| | | |
|---|---|---|
| KR | 10-1999-0017473 | 3/1999 |
| KR | 10-2008-0079937 | 9/2008 |
| KR | 10-2010-0012979 | 2/2010 |
| KR | 10-2010-0035053 | 4/2010 |
| KR | 10-2012-0113166 | 10/2012 |
| KR | 10-2016-0012693 | 2/2016 |
| WO | WO 2014/081578 | 5/2014 |

OTHER PUBLICATIONS

Korean Office Action dated Aug. 11, 2017 issued in Application No. 10-2016-0070253.
Korean Office Action dated Feb. 23, 2018 issued in Application No. 10-2016-0070253.
Chinese Office Action dated May 7, 2019 issued in Application No. 201710389935.7 (English translation attached).
Indian Office Action dated Feb. 5, 2020 issued in IN Application No. 201714019344.

* cited by examiner

EXTERNAL WATER-PURIFYING FILTER CASE, INSTALLATION STRUCTURE THEREOF AND STERILIZING METHOD USING THE SAME

CROSS-REFERENCE TO RELATED APPLICATIONS

This application claims priority under 35 U.S.C. § 119 to Korean Application No. 10-2016-0070253 filed on Jun. 7, 2016, whose entire disclosure is incorporated herein by reference.

BACKGROUND

1. Field

A filter case and an installation structure for a filter case are disclosed herein.

2. Background

Beyond storing food, refrigerators may purify water and supply cold water and ice from purified water. A refrigerator may be provided with a water filter, a water tank that stores purified water, an ice maker that freezes stored water to make ice, and a water intake to supply purified water, cold water, and ice. Refrigerators are available in a variety of different models that are capable of such functions.

In order to accomplish such functions, a line that conveys water may be installed in the refrigerator. In addition, a water intake connected to a line that supplies water into the refrigerator may be installed at a lower rear of the refrigerator. A water filter may be installed in or at a location of the refrigerator in which it may be convenient to exchange the water filter.

As a variety of kitchen appliances may be installed as built-in appliances, built-in refrigerators that are installed in furniture are increasing. However, when refrigerators are installed as built-in furniture, it may be troublesome to pull these refrigerators forward for maintenance, and it may not be possible to pull these refrigerators forward without disassembling the furniture.

Components associated with such functions as purifying water, cooling down water, and freezing water described above may typically be located in an upper or rear space of the refrigerator. For maintenance of such components, it may be necessary to pull the refrigerator forward to get to the upper space or the rear space of the refrigerator. Accordingly, a refrigerator having the above-described additional functions may be difficult to use as a built-in home appliance.

For example, in order to maintain a water filter, which may have to be replaced every several months, a user may have to get to the water filter installed in an upper part of the refrigerator to replace the water filter. For a built-in refrigerator, it may be very difficult to replace a filter. If a filter is installed in a location that is easily accessible, there may be a problem in that the filter may occupy a portion of storage space inside the refrigerator.

In addition, for water lines installed in the refrigerator that supply or convey water, it may be necessary to disinfect, sterilize, or replace the water lines if contamination occurs and germs multiply. Most of these operations require getting access to a rear of the refrigerator. For a built-in refrigerator, such operations may be cumbersome.

BRIEF DESCRIPTION OF THE DRAWINGS

The embodiments will be described in detail with reference to the following drawings in which like reference numerals refer to like elements wherein.

DETAILED DESCRIPTION

Figure 1:
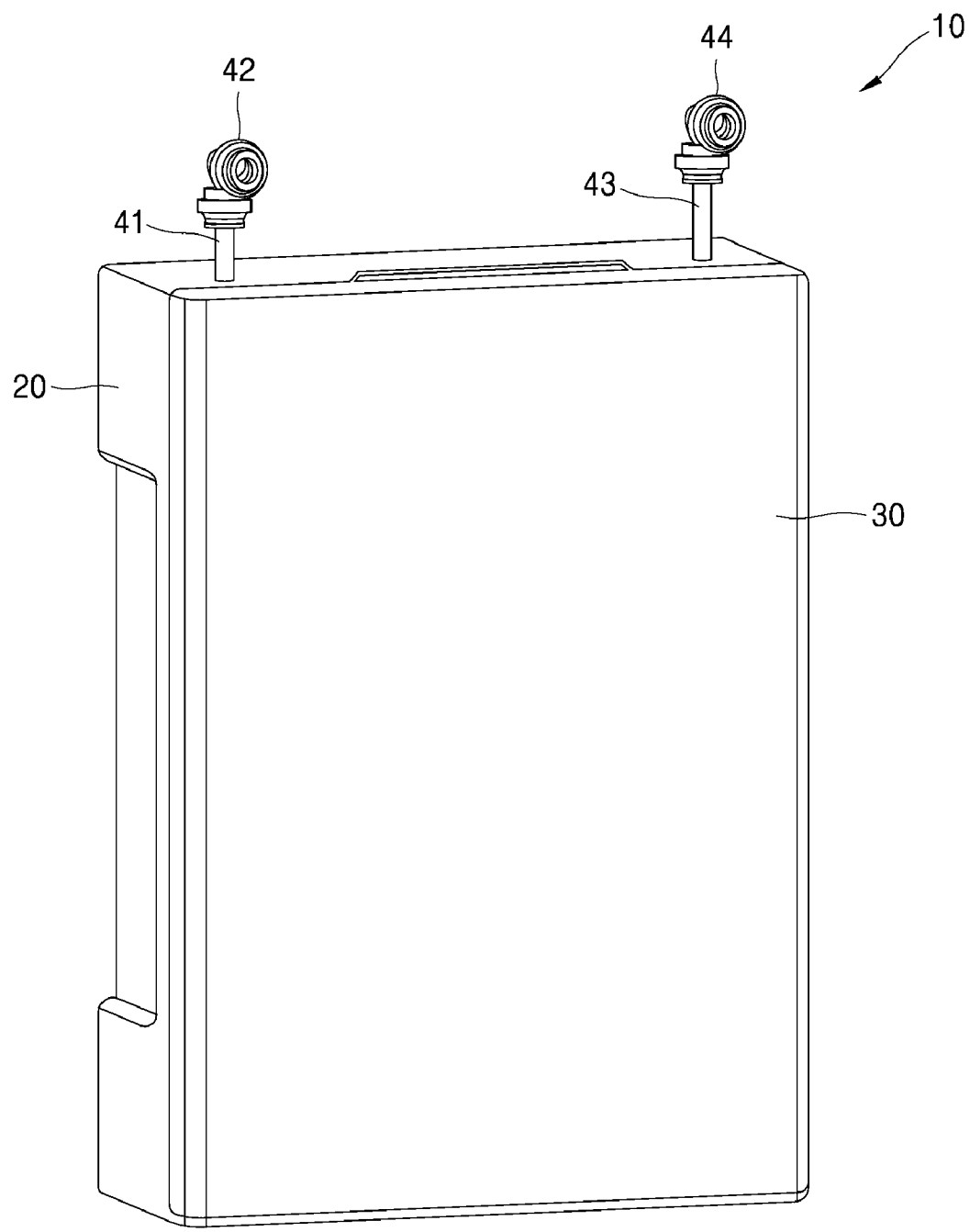
FIG. 1 is a front perspective view of a water filter case according to the present disclosure.

Referring to FIG. 1, a filter case 10 may be a substantially rectangular box shape having a larger width and height and a smaller depth. The filter case 10 may include a main body 20 and a cover 30. The main body 20 may have a space to accommodate filters and an open front side. The cover 30 may cover the open front side of the main body 20.

Figure 3:
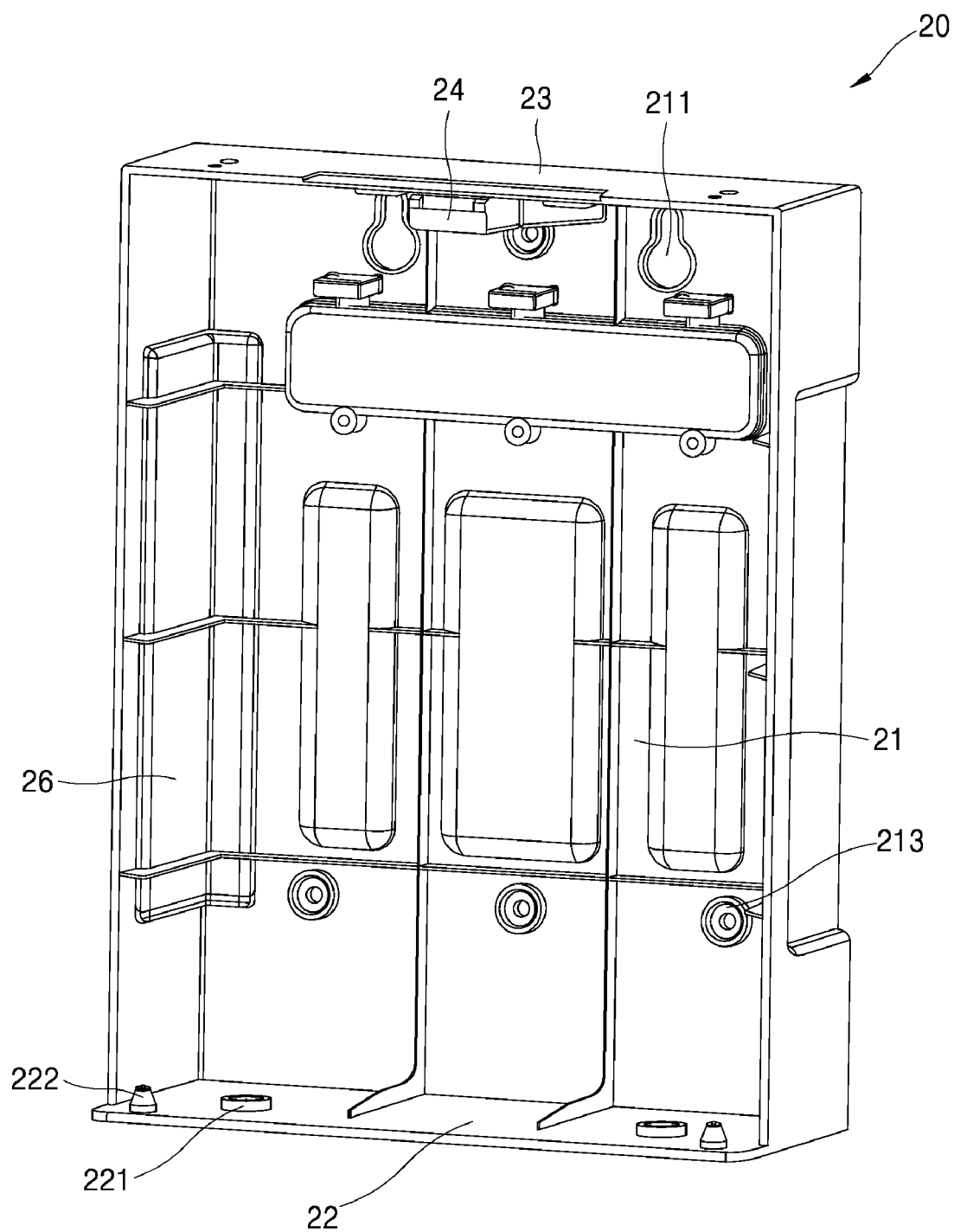
FIG. 3 is a perspective view of an inner side of a main body of the water filter case shown in FIG. 1.

Referring to FIG. 3, the main body 20 may include a rear face or rear surface 21, a bottom face or bottom surface 22 that extends forward from a lower end of the rear face 21, a first top face or first top surface 23 that extends forward from an upper end of the rear face 21, and a pair of first side surfaces 26 that extend forward from both side ends of the rear face 21, respectively. The upper and lower ends of each of the first side surfaces 26 may be connected to the first top face 23 and the bottom face 22. The bottom face 22 may extend forward more than the first top face 23 and the first side surfaces 26 extend. The bottom face 22, the first top face 23, and the pair of first side faces 26 may have ribs at various positions and in a variety of shapes for reinforcement.

In an upper portion of the rear face 21 of the main body 20, hanging holes 211 having a narrow upper hole and a wider lower hole may be formed. In the rear face 21 and the bottom face 22 of the main body, two or more screw holes 213 and 221, respectively, may be formed at a regular distance such that they are distributed evenly throughout an overall area. The hanging holes 211 may be used to hang the filter case 10 on nails or the like fastened to walls 53 and 54. By inserting a head of a screw nail fastened to a wall into the lower wider hole of each of the hanging holes 211, and allowing a body of the screw nail to be fitted in the narrower upper hole of each of the hanging holes 211, the filter case 10 may be fastened to the wall.

The screw holes 213 of the rear face 21 may fix the main body 20 to the wall by using, for example, screw nails. It may not be necessary to insert screw nails into all of the screw holes 213. An appropriate number of screw nails with sufficient fixing force may be threaded into the screw holes 213. The screw holes 221 of the bottom face 22 may fix the filter case 10 to a floor 55 while the filter case 10 is standing as shown in FIG. 3. These screw holes 213 and 221 may be appropriately selected and used depending on an installation position of the filter case 10. The hanging holes 211 and the screw holes 213 and 221 may be used together.

Figure 2:
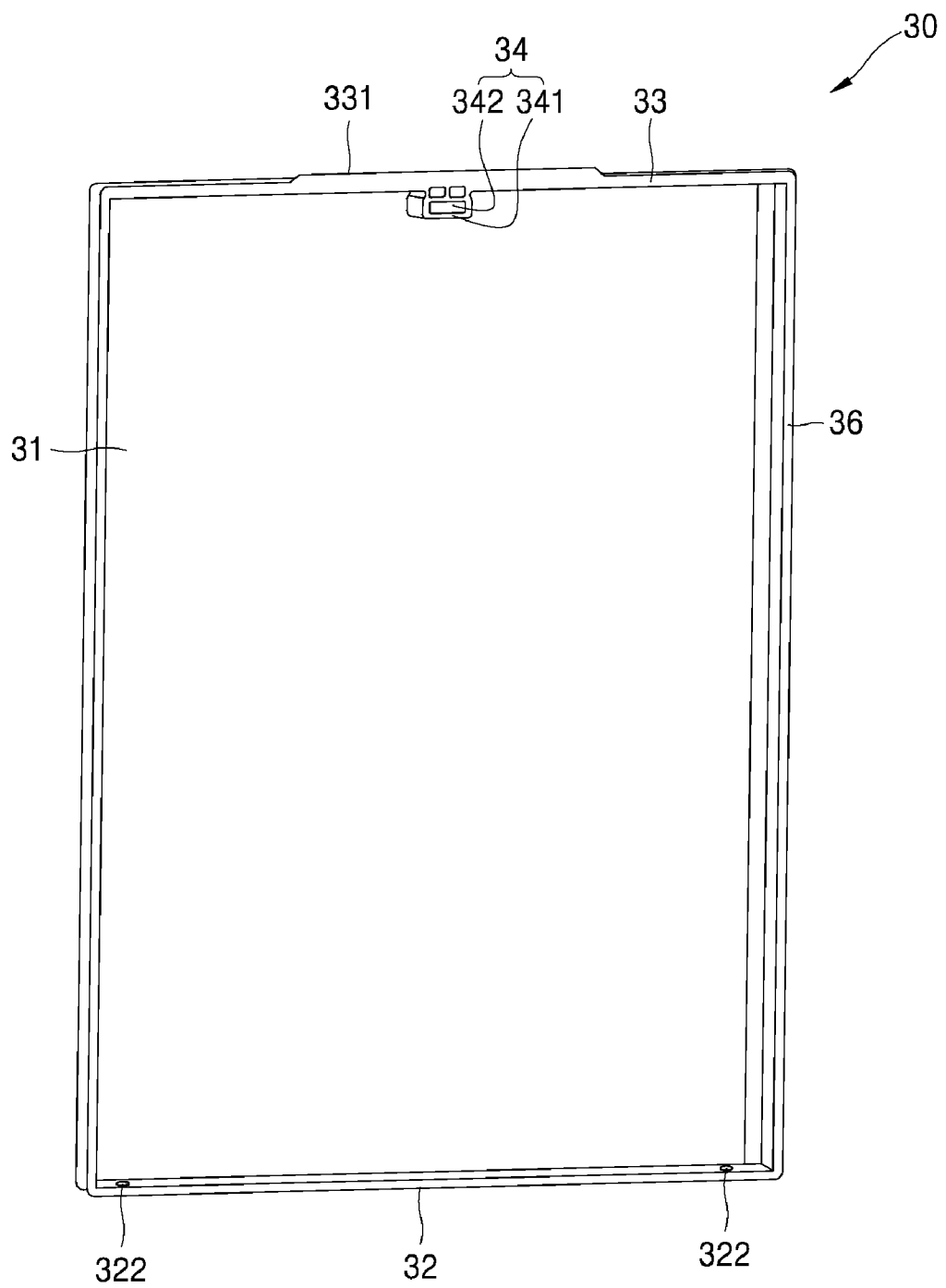
FIG. 2 is a perspective view of an inside of the water filter case shown in FIG. 1.

Referring to FIG. 2, the cover 30 may include a front face 31, an overlapping portion 32 that extends backward from a lower end of the front face 31, a second top face or second top surface 33 that extends backward from an upper end of the front face 31, and a pair of second side surfaces 36 that extend backward from both side ends of the front face 31, respectively. The upper and lower ends of each of the second side surfaces 36 may be connected to the second top face 33 and the overlapping portion 32. The main body 20 may occupy a majority of an overall depth of the case, for example, a length in a front-rear direction, and the cover 30 may occupy a relatively small portion of the overall depth.

Figure 4:
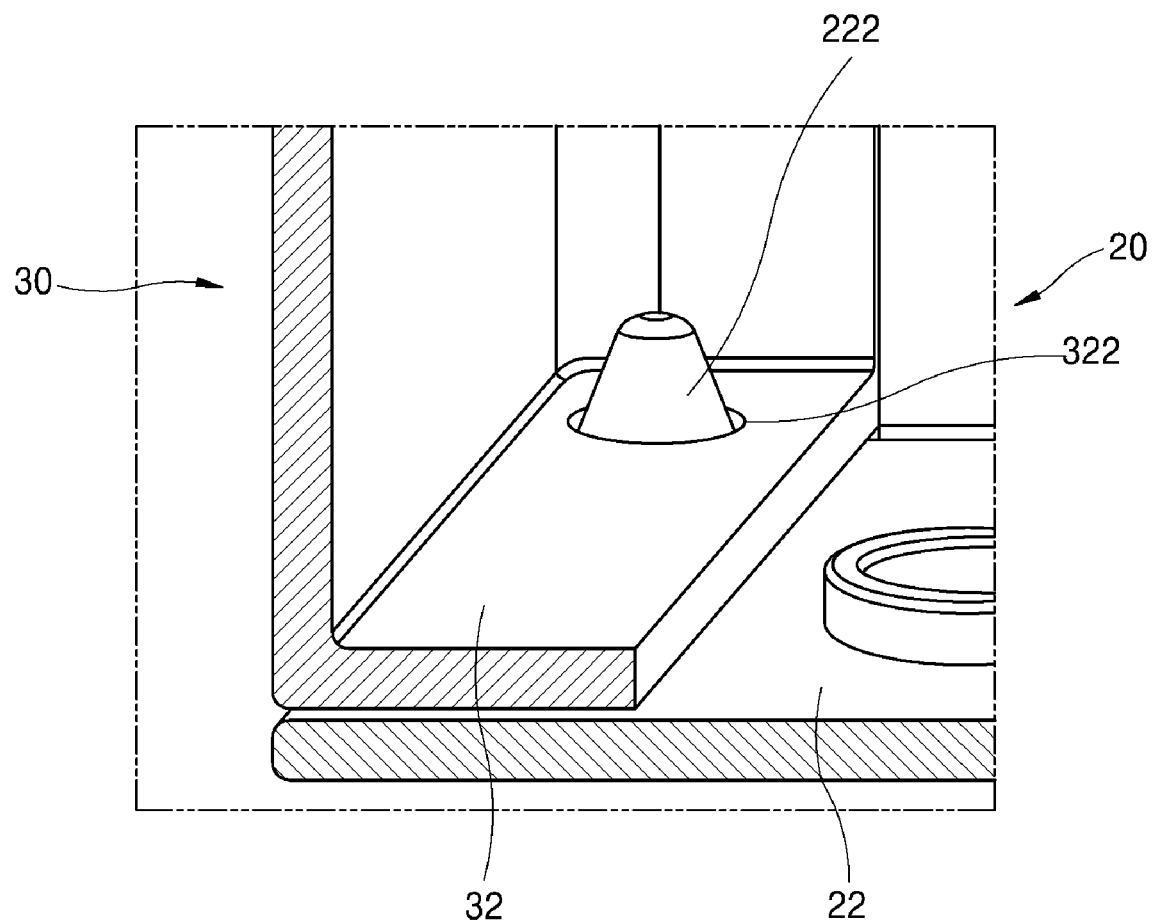
FIG. 4 is a perspective view of a lower portion of the main body coupled with a lower portion of a cover of the water filter case shown in FIG. 1.
Figure 5:
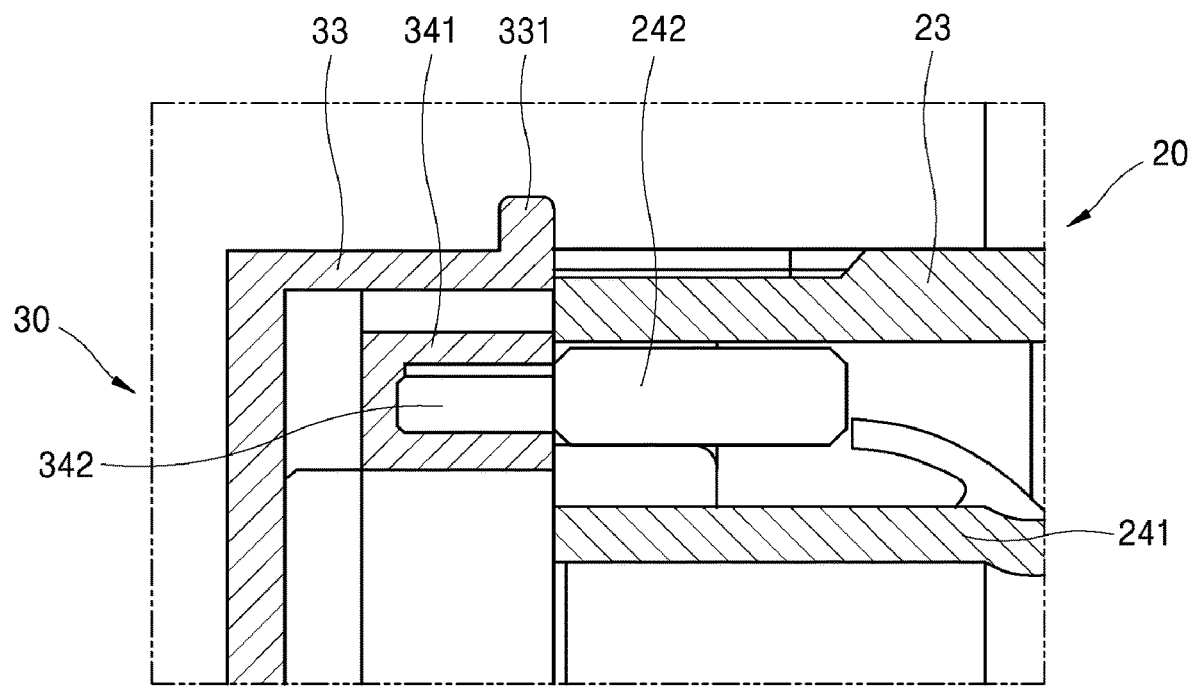
FIG. 5 is a cross-sectional view of an upper portion of the main body coupled with an upper portion of the cover of the water filter case shown in FIG. 1.

Referring to FIG. 4, the overlapping portion 32 that defines a lower portion of the cover 30 may be placed on a front upper portion of the bottom face 22 of the main body 20. The overlapping portion 32 of the cover may be placed on an upper surface of the bottom face 22 extended forward more than the first side surfaces 26 extend. In addition, rear ends of the second upper surface 33 and second side surfaces 36 of the cover 30 may meet front ends of the first upper surface 23 and the first side surfaces 26 such that the cover 30 may be coupled with the main body 20 as shown in FIG. 1.

This way of coupling is not necessarily limited to that illustrated. For example, a ratio of depths between the first top face 23 and the second top face 33 or a ratio of depths between the first side surfaces 26 and the second side surfaces 36 with respect to an overall depth of the filter case 10 may vary generally or partially. All of the ends may not be necessarily in a same plane to form an even surface.

Referring to FIG. 3 and FIG. 4, bosses 222 may be provided on the bottom face 22 of the main body 20, which may be overlapped with the overlapping portion 32 of the cover 30. Each of the bosses 222 may have a lower portion with a side surface perpendicular to a plane of the bottom face 22, for example, in a cylindrical shape, and an upper portion in a conical shape. A height of the cylindrical portion may be substantially equal to a thickness of the overlapping portion 32 of the cover 30. In the overlapping portion 32 of the cover 30, an insertion hole 322 having a size equal to or slightly larger than a diameter of a lower portion of each of the bosses 222 may be formed. A conical upper portion of the boss 222 may be thin, and thus, may be easily inserted into the insertion hole 322. Once the upper portion of the boss 222 is inserted into the insertion hole 322, an inclined surface of the conical shape of the boss 222 may help the rest of the boss 222 to be inserted smoothly.

Further, the two bosses 222 may be provided at positions aligned with each other when viewed from a left-right direction or first direction of the bottom face 22, for example, at a same depth position when viewed from the front-rear direction or second direction. According to this structure, the lower portion of the cover 30 may be restrained to the lower portion of the main body 20 at two positions in the front-rear and left-right directions, so that the lower portion of the cover 30 may be accurately fastened. Further, the bosses 222 may be located at a same depth from left and right ends, a rotation of bringing the upper portion of the cover 30 toward the upper portion of the main body 20 or a rotation in an opposite direction with the bosses 222 inserted into the insertion holes 322 may become more natural. Since the upper portion of the boss 222 has the conical shape, no interference may occur between the boss 222 and the insertion hole 322 while rotating using a lower end of the cover 30 as a rotation axis, such that the rotation may be conducted naturally or smoothly.

A shape or a number of the bosses 222 are not particularly limited to those described above as long as the bosses 222 may fulfill the above-described functionality. For example, boss 222 having a long oval or track-like cross section in the left-right direction may be formed on the bottom face 22 of main body 20, and insertion hole 322 that extends in the left-right direction to conform to a protruding portion may be formed in overlapping portion 32 of cover 30, such that a same function may be exhibited even if the boss 222 has an upper portion with a tapered surface, such as, a conical shape.

The first upper face 23 of the main body 20 and the second upper face 33 of the cover 30 may be provided with a first coupler 24 and a second coupler 34, respectively, at predetermined positions facing each other, for example, at the center thereof. The first coupler 24 may have a magnet accommodating section 241 in which a first magnet 242 may be accommodated. The second coupler 24 may have a magnet accommodating section 341 in which a second magnet 342 may be accommodated. A front side of the accommodating section 241 of the first coupler 24 and a rear side of the accommodating section 341 of the second coupler 34 may be opened to face each other. The first magnet 242 may meet or contact the second magnet 342 via opened sides, such that the first upper face 23 of the main body 20 and the second upper face 33 of the cover 30 may be fixed to each other firmly.

Although two magnets may be provided in the two couplers, respectively, a magnet may be provided at one side while a ferromagnetic material such as iron to be coupled with the magnet may be provided at another side. A fixing force that couples the upper faces 22 and 33 may be obtained by using a magnetic force when the upper faces 22 and 33 are in contact and is released when the upper faces 22 and 33 are apart or distant.

A variety of coupling mechanisms or parts may be applied as long as the cover 30 is coupled with the main body 20 by rotating or pressing the upper portion of the cover 30 with respect to the lower portion of the cover 30, and the cover 30 is separated from the main body 20 by pulling the upper portion of the cover 30 in the opposite direction or re-pressing the upper portion of the cover 30. Such mechanisms may include a VELCRO® or hook and loop tape and a pop-up type coupling structure, which may be locked if pressed once and pops up if pressed one more time.

Figure 6:
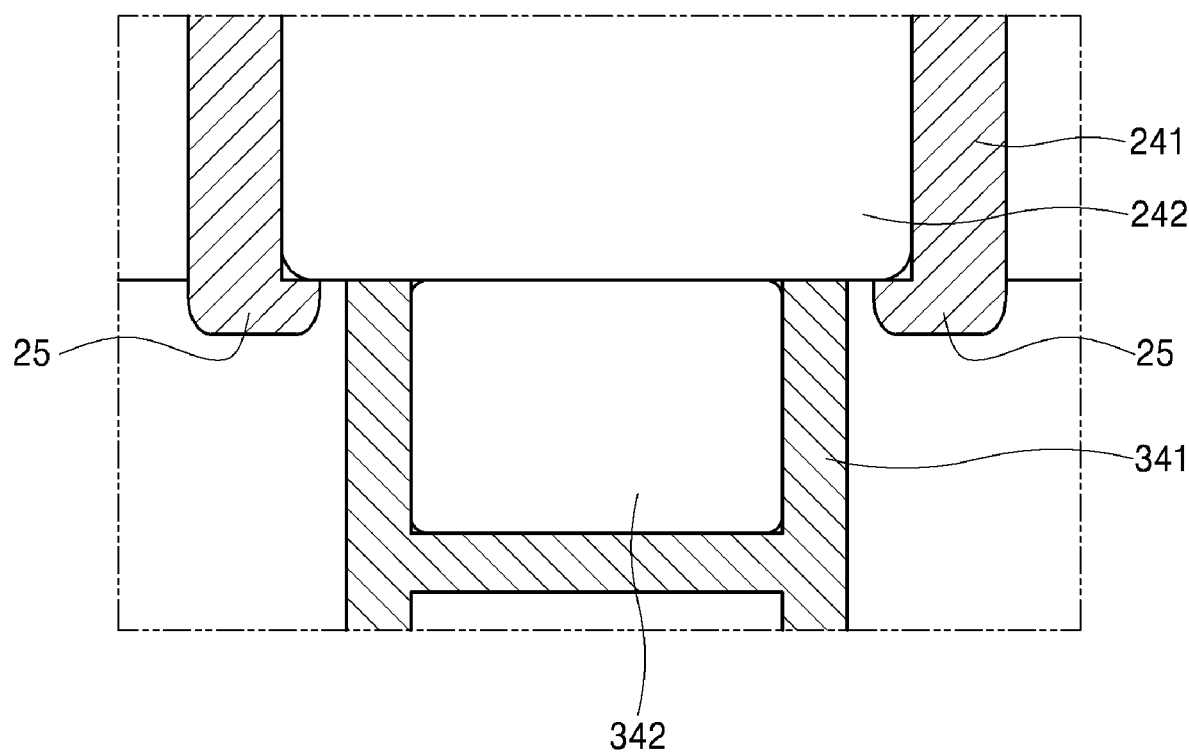
FIG. 6 is a plan view of the coupled upper portions shown in FIG. 5.
Figure 7:
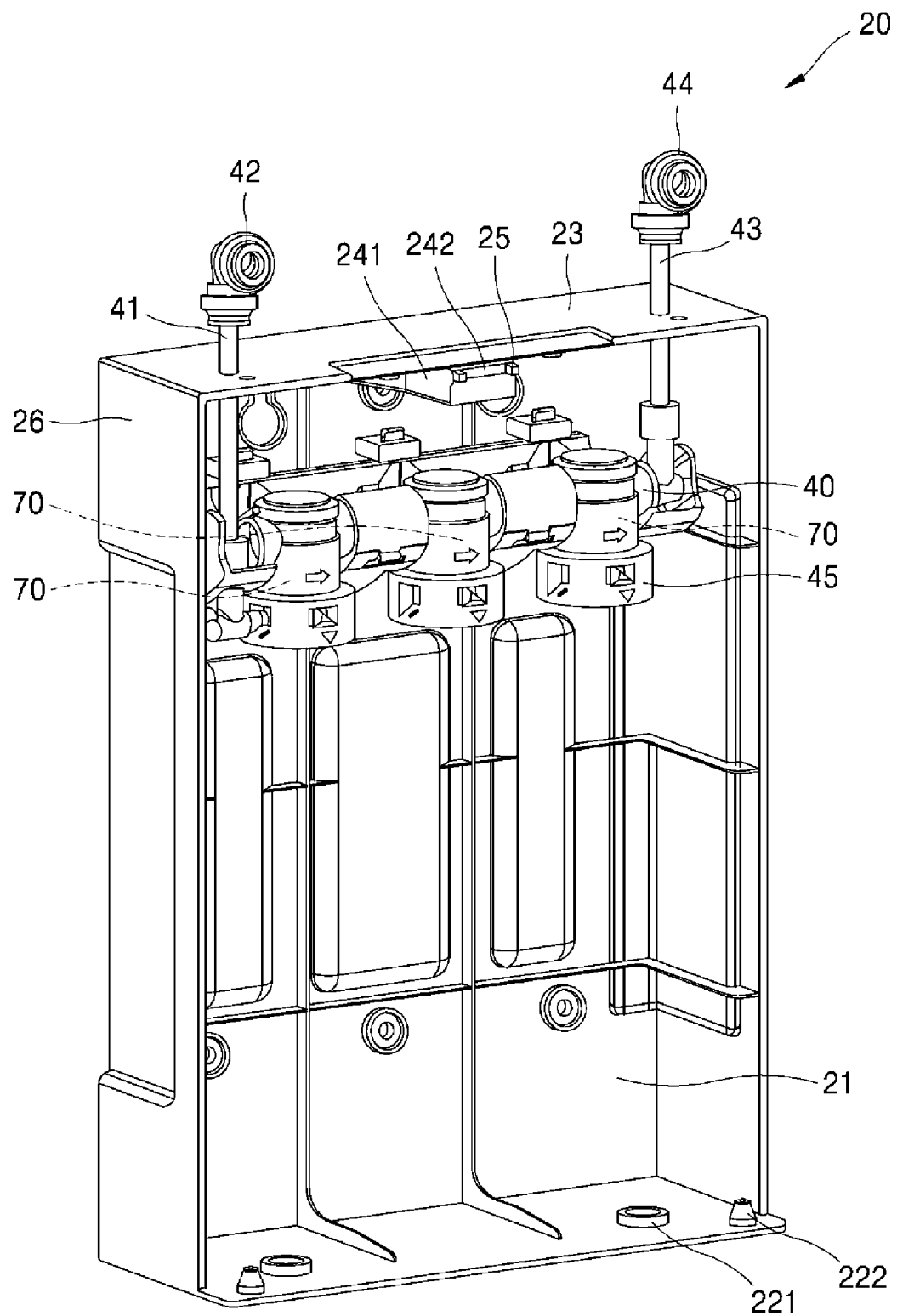
FIG. 7 is a perspective view of the main body of the water filter case shown in FIG. 1 with no water filter.
Figure 8:
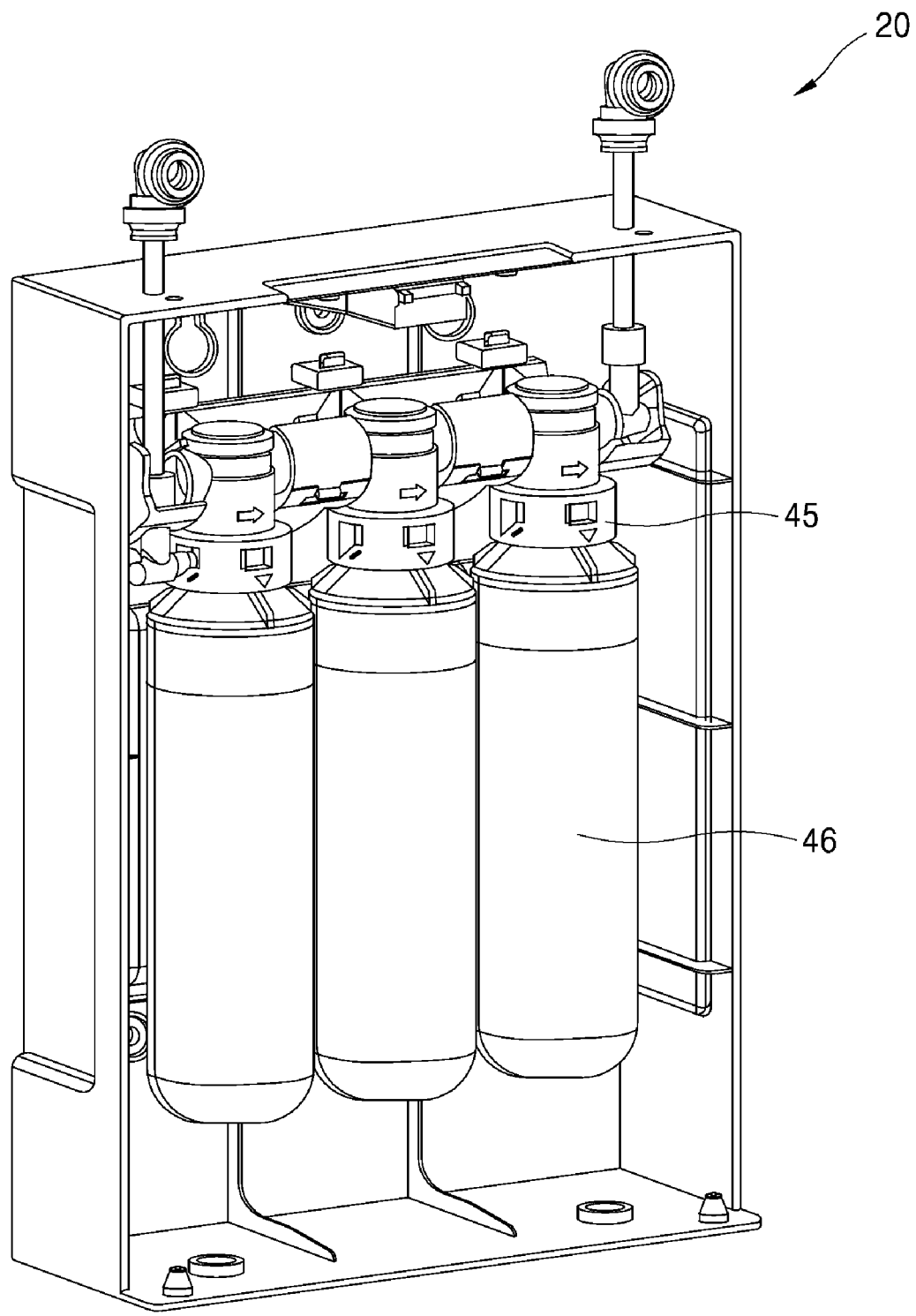
FIG. 8 is a perspective view of the main body of the water filter case shown in FIG. 1 with water filters.

Referring to FIG. 6, ribs 25 may project forward from both sides of the first coupler 24, and the second coupler 34 may be interposed between the ribs 25 with a small gap therebetween. The side surfaces of the ribs 25 may be tapered, for example, inclined so as to guide the second coupler 34 between the ribs 25.

As compared with the coupling force of the magnet 242 and 342 acting in the direction parallel to the magnetic force (that is, in the front-rear direction or second direction), the coupling force of the magnet 242 and 342 acting in the direction perpendicular to the magnetic force (that is, the left-right direction or first direction) may be somewhat insufficient. For this reason, a pair of ribs 25 may be provided at both side ends of the first coupler 24, and the second fastening part 25 may be interposed therebetween to prevent the upper portion of the cover 30 from moving in the left-right direction. In this manner, by forming the ribs 25, which may surround both sides of only one of first coupler 24 and the second coupler 34, movement between the two couplers 24 and 34 in the left-right direction may be prevented.

A handle 331 may be formed on the second coupler 34 of the cover 30 such that it may protrude therefrom. The handle 331 may be held when the upper portion of the cover 30 is pulled to separate the cover 30 from the main body 20. Accordingly, a user may decouple the second magnet 342 from the first magnet 242 by pulling the upper portion of the cover 30 by holding the handle 331 and pressing the handle 331, and the cover 30 may be separated by pulling the insertion holes 322 out of the bosses 222 while lifting the cover 30.

According to the above-described filter case structure, it may be possible to couple the cover 30 with the main body 20 of the filter case 10 at various positions and in various ways. In addition, it may be possible to simply couple and decouple the cover 30 to and from the main body 20 while obtaining coupling force sufficient for the filter case 10.

Filters 46 may be installed in the main body 20 of the filter case 10. The filters 46 may be connected to an internal pipe 40 provided in the filter case 10. The internal pipe 40 may extend in the left-right direction or first direction. The internal pipe 40 may include a plurality of filter connectors 45 that connect the filters 46 with the internal pipe 40. Each of the filters 46 may be connected to respective filter connectors 45.

At both ends of the internal pipe 40, a water inlet 41 and a water outlet 43 may be provided, respectively. The water inlet 41 and the water outlet 43 may protrude above the main body 20. The piping connectors 42 and 44 may be provided at an end of the water inlet 41 and an end of the water outlet 43, respectively. Each of the piping connectors 42 and 44 may be connected to a piping line by inserting the piping line into it to a predetermined length.

Figure 9:
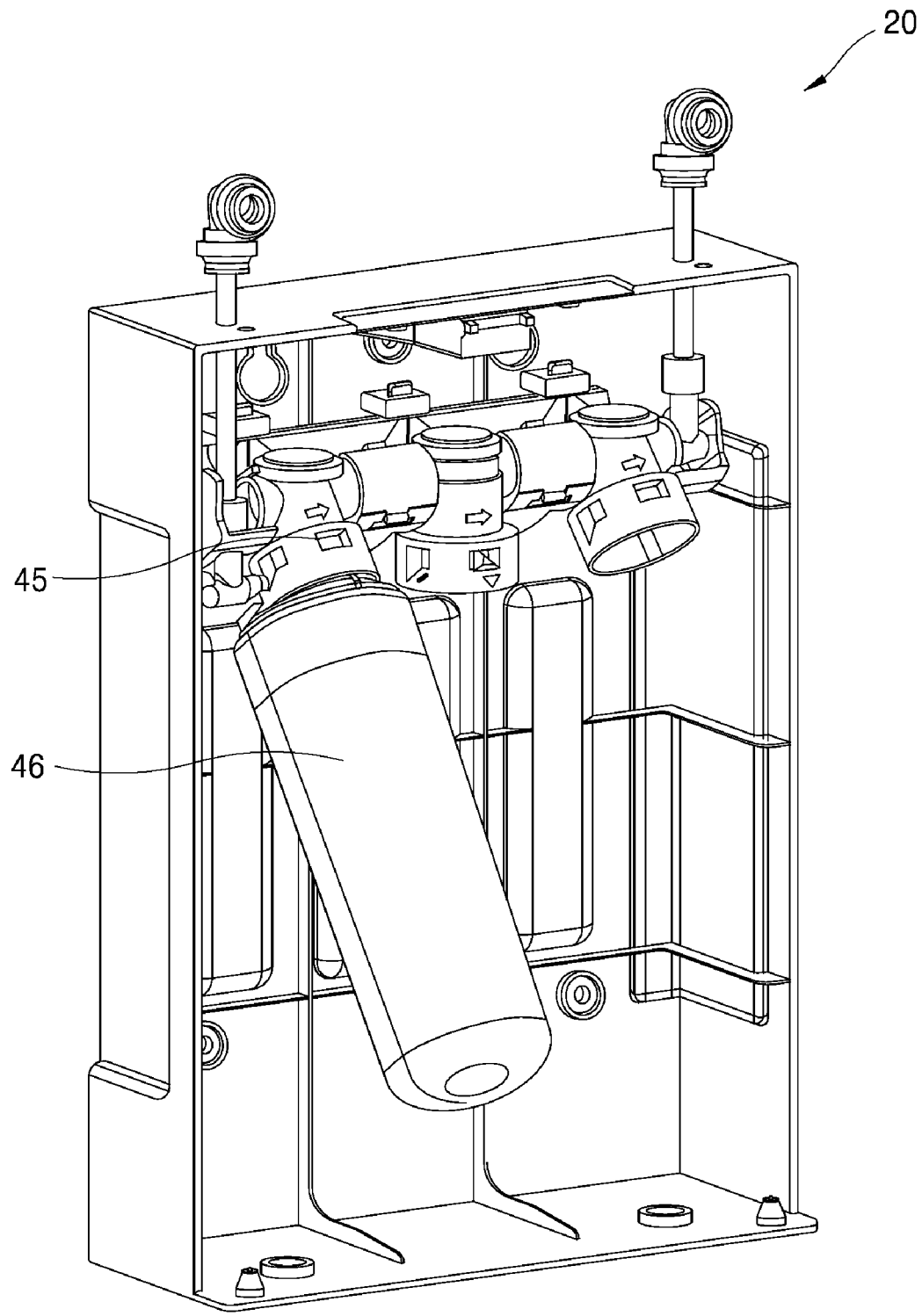
FIG. 9 is a perspective view of installing one of the water filters shown in FIG. 8 in the main body of the water filter case.

Referring to FIG. 9, the filter connectors 45 may be rotatably installed to the internal pipe 40. Connection ports of the filter connectors 45 may be rotatable at least between a bottom-facing position and a front-facing position. If the filter connectors 45 are positioned facing a front or first direction, the filters 46 may be easily connected and disconnected. The filter 46 may be connected to the filter connector 45 while the filter connector 45 faces front, and then the filter 46 may be pushed down. Accordingly, the filter connector 45 connected to the filter 46 may be rotated downward together. The filter 46 connected to the filter connector 45 may be disconnected by holding the filter 46 to rotate it forward so that the filter connector 45 may also rotate forward, and then separate the filter 46 from the filter connector 45.

The filter connectors 45 connect the internal pipe 40 with the filters 46 so that water flowing in the internal pipe 40 may pass through the filters 46 to return to the internal pipe 40. When the filter 46 is separated from the filter connector 45, a bypass line provided on the filter connect 45 may be automatically connected to the internal pipe 40. Therefore, even after the filter 46 is separated from the filter connector 45, the bypass line of the filter connector 45 may be connected to the internal pipe 40 so that water flowing in the internal pipe 40 may bypass the filter 46 to flow into the bypass line. In related art, a filter connector may not have a bypass line therein, and thus, an additional bypass line may be installed instead of a filter, to allow water to flow into a bypass line when the filter is separated.

The internal pipe 40 may be fixed to the rear face 21 of the main body 20. Pipelines may be connected to both ends of the internal pipe 40 at the water inlet 41 and the water outlet 43, respectively. The pipelines may penetrate the first upper face 23 to be exposed beyond the first upper face 23. That is, the water inlet 41 and the water outlet 43 may be supported by the first upper face 23. A line connector that connects to another line may be provided in advance at an upper end of each of the pipelines, so that installation may be more convenient.

On the internal pipe 40, three filter connectors 45, which may be rotatable with respect to the pipeline, may be sequentially provided. A first pre-carbon filter, a second ultra filtration (UF) filter, and a third post-carbon filter may be installed. The pre-carbon filter may remove heavy metals and suspended substances contained in the water and may remove residual chlorine. The UF filter may remove ordinary germs and may remove particulate matter of 0.5 micrometers or more. The post-carbon filter may remove substances that affect taste and odor of water. These filters may be replaced approximately every three months.

As described above, the pipeline having the filter connectors portion 45 may be installed in the filter case 10, and the water inlet 41 and water outlet 43 are may be exposed to an outside of the filter case 10, such that it may be possible to form the filter case 10 as a module and it may be easy to install and maintain the filter case 10.

Figure 10:
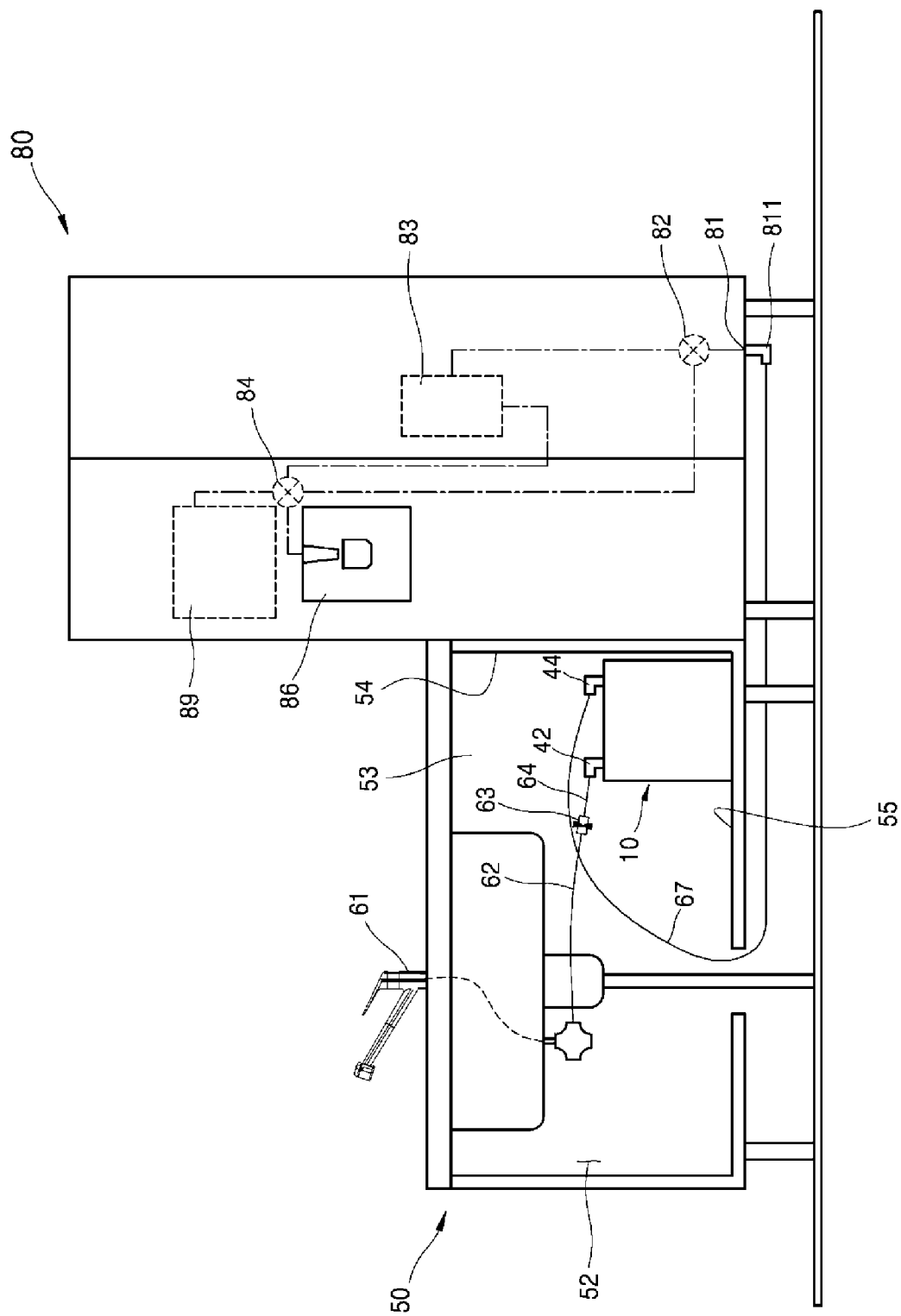
FIG. 10 is a view of a kitchen in which the water filter case shown in FIG. 1 may be installed.

Referring to FIG. 10, an installation structure that purifies and supplies water for a refrigerator that includes the external filter case 10 may be installed in a kitchen where a sink 50 having a faucet 61 and a built-in refrigerator 80 are installed. The filter case 10 may be installed in a cabinet 52 under the sink 50. The rear face 21 and the bottom face 22 of the main body 20 of the filter case 10 may be fixed to a rear wall 53 and a bottom 55 of the cabinet 52. However, the rear face 21 and the bottom face 22 may be fixed to a side wall 54 and the bottom 55 of the cabinet 52. The filter case 10 may be fixed to the rear wall 53 or the side wall 54 by hanging the filter case 10 thereon.

The faucet 61 may be connected to the piping connector 42 at the end of the water inlet 41 exposed above the filter case 10 via a faucet-connecting line 62. The piping connector 44 at the end of the water outlet 43 exposed above the filter case 10 may be connected to a line connector 811 at an end of a water intake 81 provided at a lower front of the refrigerator 80 via an egress line 67.

Raw water supplied from the faucet 61 may be purified through the filters 46 of the filter case 10 and then supplied to the refrigerator 80. Purified water supplied to the refrigerator 80 may be directly supplied to a user by a water dispenser 86, may be stored in a water tank 83 as cold water and then flow to the water dispenser 86 to be dispensed, or may pass through the water tank 83 to be cooled down and then be supplied to a ice maker 89 to be stored in an ice bucket as ice. Flow and direction of the water may be controlled by valves 82 and 84. The valves 82 and 84 may be controlled by a PCB installed in the refrigerator by receiving feedback signals indicating, for example, whether the water tank is full, whether the ice bucket is full, the temperature in the water tank, the temperature in the ice maker, the temperature of the ice, etc. The pipelines, the water tank, the ice maker and other components of the refrigerator 80 subsequent to the water intake 81 may be installed inside the refrigerator 80 in a production line, and thus they have much less possibility of leakage or defects than lines installed in the field.

As described above, by installing the filter case 10 in the storage space under the sink separated from a built-in refrigerator in a kitchen, it may be possible to save space in the refrigerator occupied by filters. When different water filters specialized for different functions are used, the space occupied by filters may become larger. By installing such water filters externally, more space for storing food may be provided in the refrigerator. In addition, by installing filters externally, it may be possible to locate them at a desired position. Accordingly, filters may be provided close to the faucet for easy piping, or filters may be installed in a larger space for easy replacement and maintenance. The filter case 10 may be installed at a hidden place so that it is not visible. For example, by installing the filter case 10 in the storage space under the sink, it may become easier to connect the faucet with water filters, and it may become more convenient to replace consumables such as a filter. In addition, when problems such as a leak occurs and lines are installed outside the refrigerator, it may be easier to cope or fix these problems without moving or disassembling the refrigerator.

The water intake 81 and the line connector 811 of the refrigerator may be provided at a lower front of the refrigerator 80. Accordingly, the egress line 67 may be connected to the line connector 811 at a front of the refrigerator without moving the refrigerator 80 out of place. Therefore, an installation structure may be easily applied to a built-in refrigerator.

That is, filters that usually occupy space in the refrigerator may be installed externally, for example, in a space under the sink, while components that require electric control, such as, e.g., a control PCB or valves, may be placed in the refrigerator. Therefore, it may be easy to install and replace lines and filters, and problems, such as leakage of line related to filters, may be easily dealt with without moving or disassembling the refrigerator.

An intermediate valve 63 may be provided at the downstream end of the faucet-connecting line 62, and the intermediate valve 63 may be connected to the pipe connector 42 of the filter case 10 via an intermediate line 64. A length of this intermediate line 64 may range from 10 to 20 cm so that the intermediate valve 63 may be provided near the case 10. Since the filter case 10 may be installed at a position that occupies as small space as possible while allowing for relatively easy access in the space, a user may easily reach the intermediate value having a short length. By installing such intermediate valve 64, it may be possible to control a supply of raw water by using the intermediate valve 63 instead of a valve of the faucet 61, which may be relatively difficult to reach.

The installation structure of the intermediate valve 63 and the intermediate line 64 may be convenient in replacing filters. For example, if a typical filter connector is used, it may be necessary to shut off the supply of the raw water when a filter is separated from the filter connector. This may be done by simply closing the intermediate valve 63. Without the intermediate valve 63, it may be troublesome to shut off the water by trying to get to a valve of the faucet.

Figure 11:
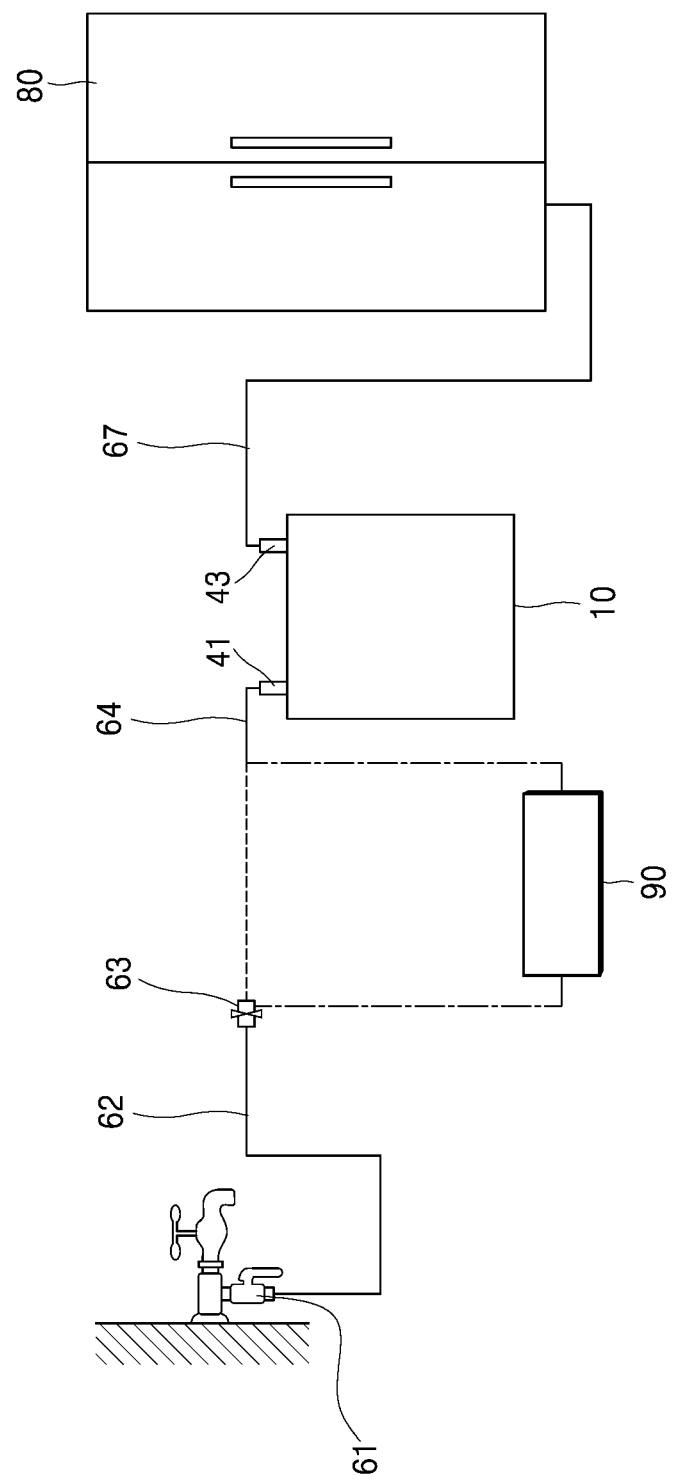
FIG. 11 is a piping system diagram showing a structure that purifies and supplies water in which a sterilizing kit may be installed.

Referring to FIG. 11, the intermediate valve 63 and the intermediate line 64 may also provide convenience when a sterilizing kit 90 for sterilization is connected. The sterilization kit 90 may discharge chlorine water, thereby sterilizing lines or pipelines provided downstream of the sterilization kit 90. The sterilizing kit 90 may be installed upstream of the filter case 10 so that all of the lines subsequent to the water filters may be sterilized.

Without the intermediate valve 63 and the intermediate line 64, a user may have to close the valve of the faucet 61 to shut off the supply of the raw water, to separate the faucet-connecting line 62 from the water inlet 41 of the filter case 10, and to install the sterilizing kit 90 between an end of the faucet-connecting line 62 and the water inlet 41 of the filter case 10 so that the water flows through the sterilization kit 90. In addition, the water remaining in the faucet-connecting line 62 after the valve is closed may pour through a downstream end of the faucet-connecting line 62, which may cause trouble.

With the intermediate valve 63 and the intermediate line 64, in contrast, a user may close the intermediate valve 63 to separate the intermediate valve 63 from the intermediate line 64 (as indicated by a dashed line in FIG. 11), and provide the sterilizing kit 90 therebetween so that water flows through it (as indicated by a dash-dotted line in FIG. 11). By doing so, it may be possible to prevent the water remaining in the line from pouring out of the line, such that sterilizing may become convenient.

A method of sterilizing using the sterilizing kit 90 may be carried out as follows. Initially, a supply of water to the filter case 10 may be shut off. This may be done by simply locking the intermediate valve 63. Subsequently, the intermediate valve 63 may be separated from the intermediate line 64, and the sterilizing kit 90 may be installed therebetween. A flexible line may be used for the lines. Since the intermediate valve 63 is installed at a downstream end of a relatively long faucet-connecting line 62, a position of the intermediate valve 63 may be adjusted as desired. This equally applies to the intermediate line 64. Therefore, when the intermediate valve 63 is separated from the intermediate line 64, it may be convenient to install the sterilization kit therebetween.

Subsequently, the filters may be separated from the filter connectors, and the internal pipe may be connected to the bypass line. When the filter is separated from the filter connector, a bypass line in the filter connector may automatically connect between disconnected parts of the internal pipe, and thus a process of installing an additional bypass line may be omitted. In contrast, when a typical filter connector is employed, it may be necessary to install an additional bypass line to the filter connector after separating the filter from the internal pipe in the filter case. Subsequently, the water is allowed to flow again so that the chlorine-containing water passes through the internal pipe and the egress line, and then may be taken into the lines in the refrigerator 80.

After the sterilization is completed, the intermediate valve 63 may be closed again to shut off the flow of water, and the sterilization kit 90 may be removed. Then, the intermediate valve 63 may be connected to the intermediate line 64, and water may be supplied again such that chlorine-containing water may be discharged. Subsequently, the supply of the water may be shut off again, the bypass line of the internal pipe may be removed from the filter connector, and the filter may be installed again. The process of removing the bypass line may be omitted if the filter connector 45, in which the bypass line is automatically separated when the filter 46 is employed, is provided. Finally, the intermediate valve 63 may be opened again to allow water purified in the filter 46 to be supplied to the refrigerator. According to this method, sterilization may be conducted very conveniently.

In addition to the above-described way of separating the intermediate valve 63 and the intermediate line 64 in the method of sterilizing, the intermediate line 64 may be separated from the water inlet 41 of the case and the sterilizing kit 90 may be interposed therebetween. Additionally, the sterilizing kit 90 may be provided between the piping connector 44 at the water outlet 43 of the case and the egress line 67.

Embodiments disclosed herein provide a filter case for a built-in refrigerator that allows easy replacement and maintenance of a filter to purify raw water, or water that is not purified, supplied to the refrigerator. Embodiments disclosed herein also provide a filter case that is located outside a refrigerator to allow easy replacement and maintenance of a filter.

Embodiments disclosed herein further provide a filter case that may be easily installed, that may be installed at a variety of locations and environments without difficulty, and that may easily open and close so that even a filter installed at an inner side thereof may be easily reached. Embodiments disclosed herein further provide an opening/closing mechanism for a filter case that allows a cover to be simply opened/closed and reliably coupled with the case. Embodiments disclosed herein also provide a filter case structure that allows a filter to be replaced very simply, and allows disinfection or sterilization to be carried out easily by connecting a bypass line when a filter is separated with no additional operation.

Embodiments disclosed herein provide an installation structure in which the filter case is installed in a kitchen where a built-in refrigerator is installed, so as to supply purified water to the refrigerator. Embodiments disclosed herein further provide a structure that purifies and supplies water that is easy to install by having an external filter case. Embodiments disclosed herein also provide a structure that purifies and supplies water that is easy to maintain and is convenient to disinfect and sterilize a line provided downstream of a filter. Embodiments disclosed herein provide a method to disinfect a line provided downstream of the filter more simply in the structure including the filter case.

According to embodiments disclosed herein, an external water filter case may be installed in a space separate from a refrigerator. The water filter case may include a main body providing an inner space in which an internal pipe is installed and water filters are installed, and a cover that covers the inner space of the main body and is detachably coupled with the main body. The main body may have a box shape with an open front side. In order to allow a lower portion of the main body to be easily coupled with a lower portion of the cover by placing an overlapping portion that is a bottom face of the cover on a bottom face of the main body, bosses may be formed on the bottom face of the main body and insertion holes may be formed in the overlapping portion of the cover so that the bosses may be inserted into the insertion holes. In addition, couplers may be formed in upper portions of the main body and the cover, respectively, such that the upper portion of the main body may be coupled with the upper portion of the cover by bringing the cover close to the main body and the upper portion of the main body may be easily separated from the upper portion of the cover by pulling the cover away from the main body. Such structures may provide an external filter case in which the cover can be easily detached from the main body while the cover may be reliably coupled with the main body.

For example, the main body may include a rear face forming the rear surface of the case, a bottom face that extends forward from the lower end of the rear face, a first top face that extends forward from the upper end of the rear face, bosses protruding upward from the bottom face, and a first coupler formed in the first top face.

The cover may include a front face forming the front surface of the case, an overlapping portion that extends backward from the lower end of the front face, a second top face that extends backward from the upper end of the front face, insertion holes formed in the overlap portion, the bosses being inserted into the insertion holes, and a second coupler formed in the second top face and to be coupled with the first coupler.

The overlapping portion may be placed on the bottom face such that the bosses are inserted into the insertion hole, while the second top face of the cover approaches the first top face of the main body so that the first coupler is coupled with the second coupler. Accordingly, the cover may be fixed to the main body.

By forming the bosses at two different locations spaced apart from each other, it may be possible to restrict the cover from rotating with respect to a rotation axis perpendicular to the bottom face of the main body. When the bosses are accurately aligned in a left-right or first direction, the rotation of bringing the upper portion of the cover toward the upper portion of the main body or the rotation in the opposite direction with the bosses inserted into the insertion holes may become more natural or smooth.

Each of the bosses may have a conical upper portion, such that it may be easier to insert the bosses into the insertion holes. After the bosses are inserted into the insertion holes, a center of the insertion hole may be guided by an inclined surface of the conical shape of the boss, such that the center of the insertion hole may be in line with a center of the conical shape of the boss. Accordingly, the cover may be matched with the main body even without any additional fitting operation. The inclined surface of the conical shape may facilitate the rotation of the upper portion of the cover toward or away from the upper portion of the main body, with the lower portion of the cover supported.

The first and second couplers may include a pair of magnets facing each other or a magnet and a material attracted by the magnet. Accordingly, the upper portion of the main body may be coupled with or separated from the upper portion of the cover by bringing the first and second couplers close to each other or separating them from each other.

An anti-rocking mechanism may be provided in each of the first top face and the second top face, which may restrict the second top face from moving left or right relative to the first top face. By doing so, it may be possible to reinforce a coupling force of the cover in the left-right direction that may be weaker than the front-rear direction in which the magnetic force acts.

The anti-rocking mechanism may have a pair of protruding ribs on both sides of the first coupler or the second coupler, such that the second coupler or the first coupler may be accommodated between the pair of the protruding ribs. According to this mechanism, the protruding ribs and a counterpart thereof may be additionally provided in the accommodating section of the main body and the accommodating section of the cover, respectively, in which the magnet and/or the material attracted by the magnet are installed, such that the mechanism may be simple and easy to manufacture.

The filter case may further include an internal pipe having a water inlet and a water outlet and may be provided in a space defined by the main body and the cover and a filter connector provided in a path of the internal pipe. The filter connector may be rotatable between a position at which a filter insertion direction of the filter connector faces a front of the case and a position at which the filter insertion direction of the filter connector faces a bottom of the case, such that a size of the case may be more compact, and replacement of the filter may be much easier.

The filter connector may include a bypass line, such that water in the internal pipe may pass through a filter when the filter is connected to the filter connector, while the bypass line may be automatically connected to the internal pipe when the filter is separated from the filter connector to allow the water in the internal pipe to flow through the bypass line. Accordingly, it may not be necessary to lock the line when a filter is replaced, and no process of installing a bypass line may be required after the filter is separated to sterilize it.

Each of the rear face and bottom face of the case may include screw holes at two or more different locations. By using them, the rear face of the case may be fixed to a wall or the bottom face of the case may be fixed to a floor. A hanging hole may be formed in the rear face of the main body. The hanging hole may include a lower larger hole and an upper smaller hole connected to the lower hole. Accordingly, the case may be fixed to the wall above the floor.

According to another embodiment disclosed herein, an installation structure, which may be located between a sink with a faucet and a built-in refrigerator installed adjacent to the sink to purify water supplied from the faucet to supply it to the built-in refrigerator, may include a water filter case installed in a cabinet under the sink with the faucet; a faucet-connecting line having one end connected to the faucet and an opposed end connected to a water inlet of the filter case; an egress line having one end connected to a water outlet of the filter case and an opposed end connected to a water intake provided at a lower front of the refrigerator, and a filter connected to a filter connector of an internal pipe provided in the filter case. By installing the filter case in the cabinet under the sink, it may be easier to install lines between the faucet and the filter case and between the filter case and the water intake provided at the lower front of the refrigerator. As the water intake is provided at the lower front of the refrigerator, it may not be necessary to pull the refrigerator out in order to connect a line to the refrigerator.

An intermediate valve and an intermediate line may be sequentially provided along a direction in which water flows and may be provided between the opposed end of the faucet-connecting line and the water inlet of the filter case. According to this installation structure, it may be possible to control the supply of water by simply opening/closing the intermediate valve adjacent to the filter case which may be relatively easy to reach, instead of opening/closing the valve of the faucet which may be difficult to reach. The intermediate line may be separated and a sterilizing kit may be connected in a bypass line instead of the intermediate line, such that it may be easy to sterilize lines subsequent to the filter.

According to embodiments disclosed herein, a method of sterilizing lines, in an installation structure where a sink with a faucet, a built-in refrigerator instance adjacent to the sink, and a water filter case installed in a cabinet under the sink with the faucet and having a water inlet connected to the faucet via a faucet-connecting line and an water outlet connected to the refrigerator via an egress line, may include shutting off supply of water to the filter case, disposing a sterilizing kit between a downstream end of the faucet-connecting line and a water inlet of the filter case while the supply of water is shut off, separating a filter installed in the filter case from the pipe to connect the separated pieces of the pipe with a bypass line, supplying the water while the sterilizing kit is provided and the bypass line is connected, shutting off the water after sterilizing; separating the sterilizing kit while the water is shut off to connect the downstream end of the faucet-connecting line with the water inlet of the filter case, releasing the bypass line to install a filter, and supplying the water to resume purification and supply of the water.

The supplying water to the filter or shutting off the water may be controlled by adjusting an intermediate valve installed at the downstream end of the faucet-connecting line. By utilizing the installation structure and the method of sterilizing lines, it may be possible to sterilize all sections of water flow lines in a very convenient way.

According to embodiments disclosed herein, a refrigerator, which has a valve for controlling whether to flow water supplied into the refrigerator and controlling a direction of the flow, may include a filter case installed outside the refrigerator and comprising a water filter for purifying water before the water flows into the refrigerator, a faucet-connecting line installed outside the refrigerator and having one end connected to a faucet and an opposed end connected to a water inlet of the filter case, and an egress line installed outside the refrigerator and having one end connected to a water outlet of the filter case and an opposed end connected to a water intake of the refrigerator.

According to this refrigerator structure, sensors or valves that require electrical control may be provided inside the refrigerator, whereas lines for supplying water to the refrigerator, filters for purifying water and the case including the filters may be installed outside the refrigerator. Accordingly, the refrigerator may have more space for storing food, and may be maintained more conveniently without moving, dissembling or installing the refrigerator by providing filters and lines outside the refrigerator.

The filter case may be installed in a space under the sink, such that the case and the lines are not visible to thereby provide better appearance. It may be easy to connect the lines to the faucet, and there may be provided a wider space for installing lines, replacing filters and maintenance. The water intake may be provided at the lower front of the refrigerator, such that it may be possible to install the filter case and the lines after the refrigerator has been installed, without moving or dissembling the refrigerator.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system to provide purified water to a water intake of a refrigerator, the system comprising
   a filter case provided outside of the refrigerator and including:
      a water inlet;
      a water outlet; and
      at least one water filter that purifies water;
   a faucet-connecting line having a first end connected to a water faucet provided outside the refrigerator and a second end connected to the water inlet of the filter case; and
   an egress line having a first end connected to the water outlet of the filter case and a second end connected to the water intake of the refrigerator,
   wherein the filter case includes:
      a main body including:
         a rear face that forms a rear surface of the filter case,
         a bottom face that extends forward from a lower end of the rear face,
         a first top face that extends forward from an upper end of the rear face,
         a plurality of bosses that protrudes upward from the bottom face, and
         a first coupler provided in the first top face; and
      a cover including:
         a front face that forms a front surface of the filter case,
         an overlapping portion that extends backward from a lower end of the front face,
         a second top face that extends backward from an upper end of the front face,
         a plurality of insertion holes formed in the overlapping portion, the plurality of bosses being inserted into the plurality of insertion holes, respectively, and
         a second coupler provided in the second top face, the second coupling part coupled with the first coupler, and
   wherein the cover is fixed to the main body when the plurality of bosses are inserted into the plurality of insertion holes such that the overlapping portion is placed on the bottom face and the second top face of the cover meets the first top face of the main body to couple the first coupler with the second coupler.

2. The system of claim 1, wherein the filter case is provided under a sink.

3. The system of claim 1, wherein the water intake of the refrigerator is provided at a lower front of the refrigerator.

4. The system of claim 1, wherein the plurality of bosses are aligned with one another in a width direction of the bottom face of the main body and are provided at two or more positions, respectively, or are elongated in the width direction, and wherein an upper portion of each of the plurality of bosses has a conical shape.

5. The system of claim 1, wherein the first coupler includes a first magnet and the second coupler includes a second magnet that faces the first magnet, and
   wherein a pair of ribs protrude to surround sides of the first coupler or the second coupler such that the second coupler or the first coupler is accommodated between the pair of the ribs and the second top face is restricted from moving relative to the first top face.

6. The system of claim 1, wherein each of the rear face and the bottom face of the main body includes screw holes at two or more different locations, and
   wherein at least one hanging hole is formed in the rear face of the main body, the at least one hanging hole having a lower larger hole and an upper smaller hole connected to the lower larger hole.

7. The system of claim 1, wherein the refrigerator includes a valve that controls a flow and a direction of the purified water inside the refrigerator, and a water dispenser to output the purified water.

8. The system of claim 1, wherein an intermediate valve and an intermediate line are provided between the second end of the faucet-connecting line and the water inlet of the water filter case.

9. The system of claim 8, wherein a sterilizing kit is detachably provided between the intermediate valve and the intermediate line.

10. The system of claim 9, wherein the sterilizing kit discharges chlorine.

11. An installation structure that purifies and supplies water from a faucet of a sink to a refrigerator provided adjacent to the sink, the installation structure comprising:
    a water filter case installed in a cabinet under the sink;
    a faucet-connecting line having one end connected to the faucet and another end connected to a water inlet of the water filter case;
    an egress line having one end connected to a water outlet of the water filter case and another end connected to a water intake provided at a lower front of the refrigerator; and
    at least one filter connected to at least one filter connector on an internal pipe provided in the water filter case,
    wherein the water filter case includes:
       a main body including:
          a rear face that forms a rear surface of the water filter case,
          a bottom face that extends forward from a lower end of the rear face,
          a first top face that extends forward from an upper end of the rear face,
          a plurality of bosses that protrudes upward from the bottom face, and
          a first coupler provided in the first top face; and
       a cover including
          a front face that forms a front surface of the water filter case,
          an overlapping portion that extends backward from a lower end of the front face,
          a second top face that extends backward from an upper end of the front face,
          a plurality of insertion holes formed in the overlapping portion, the plurality of bosses being inserted into the plurality of insertion holes, respectively, and
          a second coupler provided in the second top face, the second coupling part coupled with the first coupler,
    wherein the cover is fixed to the main body when the plurality of bosses are inserted into the plurality of insertion holes such that the overlapping portion is placed on the bottom face and the second top face of the cover meets the first top face of the main body to couple the first coupler with the second coupler.

12. The installation structure of claim 11, wherein an intermediate valve and an intermediate line are sequentially provided between the other end of the faucet-connecting line and the water inlet of the water filter case along a direction in which water flows.

13. The installation structure of claim 12, wherein a sterilizing kit is detachably provided between the intermediate valve and the intermediate line.

14. The installation structure of claim 11, wherein the plurality of bosses are aligned with one another in a width direction of the bottom face of the main body and are provided at two or more positions, respectively, or are elongated in the width direction, and wherein an upper portion of each of the plurality of bosses has a conical shape.

15. The installation structure of claim 11, wherein the first coupler includes a first magnet and the second coupler includes a second magnet that faces the first magnet, and
wherein a pair of ribs protrude to surround sides of the first coupler or the second coupler such that the second coupler or the first coupler is accommodated between the pair of the ribs and the second top face is restricted from moving relative to the first top face.

16. The installation structure of claim 11, wherein the rear face and the bottom face of the main body include two or more screw holes, and
wherein at least one hanging hole is formed in the rear face of the main body.

17. The installation structure of claim 12, wherein the sterilizing kit discharges chlorine.

18. A refrigerator comprising
an input port to receive water;
output port to discharge water from the refrigerator; and
a valve that controls a flow of water between the input port and the output port,
wherein the input port receives water from a filter assembly that is positioned remotely from the refrigerator, and
wherein the filter assembly includes:
a filter case:
an inlet provided on the filter case and connected to a water source;
an outlet provided on the filter case and in fluid communication with the input port of the refrigerator; and
a water filter provided in the filter case to purify water flowing between the inlet and the outlet,
wherein the filter case includes:
a main body including:
a rear face that forms a rear surface of the filter case,
a bottom face that extends forward from a lower end of the rear face,
a first top face that extends forward from an upper end of the rear face,
a plurality of bosses that protrudes upward from the bottom face, and
a first coupler provided in the first top face; and
a cover including:
a front face that forms a front surface of the filter case,
an overlapping portion that extends backward from a lower end of the front face,
a second top face that extends backward from an upper end of the front face,
a plurality of insertion holes formed in the overlapping portion, the plurality of bosses being inserted into the plurality of insertion holes, respectively, and
a second coupler provided in the second top face, the second coupling part coupled with the first coupler, and
wherein the cover is fixed to the main body when the plurality of bosses are inserted into the plurality of insertion holes such that the overlapping portion is placed on the bottom face, and the second top face of the cover meets the first top face of the main body to connect the first coupler and the second coupler.

19. The refrigerator of claim 18, further comprising a water tank to receive and cool water between the input port and the output port.

20. The refrigerator of claim 18, further comprising an ice maker, wherein the valve is further configured to direct the flow of water to at least one of the ice maker or the output port.

* * * * *